United States Patent

Kitamura

(10) Patent No.: US 9,306,900 B2
(45) Date of Patent: Apr. 5, 2016

(54) COMMUNICATION DEVICE, COMMUNICATION SYSTEM, AND COMMUNICATION METHOD

(75) Inventor: Hiroshi Kitamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 212 days.

(21) Appl. No.: 14/342,567

(22) PCT Filed: Sep. 4, 2012

(86) PCT No.: PCT/JP2012/005602
§ 371 (c)(1),
(2), (4) Date: Mar. 4, 2014

(87) PCT Pub. No.: WO2013/035310
PCT Pub. Date: Mar. 14, 2013

(65) Prior Publication Data
US 2014/0229635 A1 Aug. 14, 2014

(30) Foreign Application Priority Data

Sep. 6, 2011 (JP) .................................. 2011-193516

(51) Int. Cl.
*G06F 15/16* (2006.01)
*H04L 29/12* (2006.01)

(52) U.S. Cl.
CPC .......... *H04L 61/1511* (2013.01); *H04L 61/303* (2013.01); *H04L 61/6059* (2013.01)

(58) Field of Classification Search
USPC ......... 709/245, 223, 217, 224, 206, 229, 220, 709/241, 205, 204, 207, 203
See application file for complete search history.

(56) References Cited

U.S. PATENT DOCUMENTS

| 6,430,623 | B1 * | 8/2002 | Alkhatib | ................. H04L 29/06 370/390 |
| 7,058,706 | B1 * | 6/2006 | Iyer | ..................... H04L 43/0852 709/223 |
| 7,908,328 | B1 * | 3/2011 | Hulten | ................. H04L 12/585 709/204 |
| 8,862,735 | B1 * | 10/2014 | Singh | ..................... H04L 63/20 709/221 |
| 9,130,994 | B1 * | 9/2015 | Newstadt | ................ H04L 67/18 |

(Continued)

FOREIGN PATENT DOCUMENTS

| JP | 2005-86503 A | 3/2005 |
| WO | 2006/067951 A1 | 6/2006 |
| WO | 2012/132356 A1 | 10/2012 |

OTHER PUBLICATIONS

P. Mockapetris, "Domain Names—Implementation and Specification", Network Working Group, RFC 1035, Nov. 1987, 42 pages.

(Continued)

*Primary Examiner* — Jude Jean Gilles
(74) *Attorney, Agent, or Firm* — Sughrue Mion, PLLC

(57) ABSTRACT

Provided is a communication device including: an address acquiring unit that acquires an IP address; a generating unit that generates, on the basis of the acquired IP address, a special reverse lookup domain name which is different from a standard reverse lookup domain name serving as a key for obtaining a domain name corresponding to the acquired IP address through a reverse DNS lookup; and a reverse-DNS-lookup processing unit that performs the reverse DNS lookup using the generated special reverse lookup domain name as a key, and acquires node descriptor data, which is different from the domain name and is associated with a communication device corresponding to the IP address acquired by the address acquiring unit.

11 Claims, 5 Drawing Sheets

(56) References Cited

U.S. PATENT DOCUMENTS

| | | | |
|---|---|---|---|
| 2005/0076139 A1* | 4/2005 | Jinmei | H04L 29/12066 709/245 |
| 2005/0108244 A1* | 5/2005 | Riise | G06F 17/3087 |
| 2006/0067343 A1* | 3/2006 | Tagawa | H04L 41/22 370/401 |
| 2006/0195597 A1* | 8/2006 | Shaked | G06F 21/305 709/229 |
| 2008/0065746 A1* | 3/2008 | Moghaddam | G06F 17/30899 709/220 |
| 2009/0254658 A1 | 10/2009 | Kamikura et al. | |
| 2011/0299538 A1* | 12/2011 | Maruta | H04L 12/4641 370/392 |
| 2013/0163430 A1* | 6/2013 | Gell | H04N 1/23439 370/235 |

OTHER PUBLICATIONS

International Search Report for PCT/JP2012/005602 dated Nov. 6, 2012.

\* cited by examiner

COMMUNICATION DEVICE, COMMUNICATION SYSTEM, AND COMMUNICATION METHOD

CROSS REFERENCE TO RELATED APPLICATIONS

This application is a National Stage of International Application No. PCT/JP2012/005602 filed Sep. 4, 2012, claiming priority based on Japanese Patent Application No. 2011-193516 filed Sep. 6, 2011, the contents of all of which are incorporated herein by reference in their entirety.

TECHNICAL FIELD

The present invention relates to a technique of a reverse DNS (Domain Name System) lookup.

BACKGROUND ART

A reverse DNS lookup that acquires a fully qualified domain name (FQDN) on the basis of an internet protocol (IP) address is described, for example, in Non-Patent Document 1 described below. In FQDN, a domain name is described in a manner that specifies, for example, a domain name, a sub domain name, a hostname, and so on without omission. Hereinafter, the character string, which is information on each communication node and which is described in a specified form such as FQDN, is referred to as a domain name. A communication device performs a reverse DNS lookup using an IP address acquired through a certain method, thereby acquiring a domain name of a communication device identified on the basis of the IP address.

RELATED DOCUMENT

Non-Patent Document

Non-Patent Document 1: P. Mockapetris, "Domain Names-Implementation and Specification", Network Working Group, RFC 1035, November 1987.

SUMMARY OF THE INVENTION

End users can obtain the larger amount of information from the domain name than that from the IP address. However, there is a possibility that the amount of information obtained from the domain name is not sufficient for the end user. The end user may need more detailed information on the communication node than the information indicated by the domain name.

The present invention has been made in view of the circumstances described above, and provides a technique that makes it possible to acquire more detailed information than the information acquired from the domain name using a reverse DNS lookup.

Each mode of the present invention employs the following configurations to solve the problem described above.

A communication device according to the first aspect includes: an address acquiring unit that acquires an IP address; a generating unit that generates, on the basis of the IP address acquired by the address acquiring unit, a special reverse lookup domain name which is different from a standard reverse lookup domain name serving as a key for obtaining a domain name corresponding to the IP address through a reverse DNS lookup; and a reverse-DNS-lookup processing unit that performs the reverse DNS lookup using, as a key, the special reverse lookup domain name generated by the generating unit, and acquires node descriptor data, which is different from the domain name and is associated with a communication device corresponding to the IP address acquired by the address acquiring unit.

A communication method according to the second aspect includes: acquiring an IP address; generating, on the basis of the acquired IP address, a special reverse lookup domain name which is different from a standard reverse lookup domain name serving as a key for obtaining a domain name corresponding to the acquired IP address through a reverse DNS lookup; performing the reverse DNS lookup using the generated special reverse lookup domain name as a key; and, acquiring node descriptor data, which is different from the domain name and is associated with a communication device corresponding to the acquired IP address.

It should be noted that other aspects of the present invention may include a program that causes a computer to realize each configuration in the first aspect, and a computer-readable storage medium that stores the program. This storage medium includes a non-transitory tangible medium.

According to the aspects described above, it is possible to provide a technique that makes it possible to acquire more detailed information than the domain name using a reverse DNS lookup.

BRIEF DESCRIPTION OF THE DRAWINGS

The above-described object and other objects of the present invention, and features and advantages of the present invention will be made further clear by the preferred embodiment described below and the following drawings attached thereto.

DESCRIPTION OF EMBODIMENTS

Figure 1:
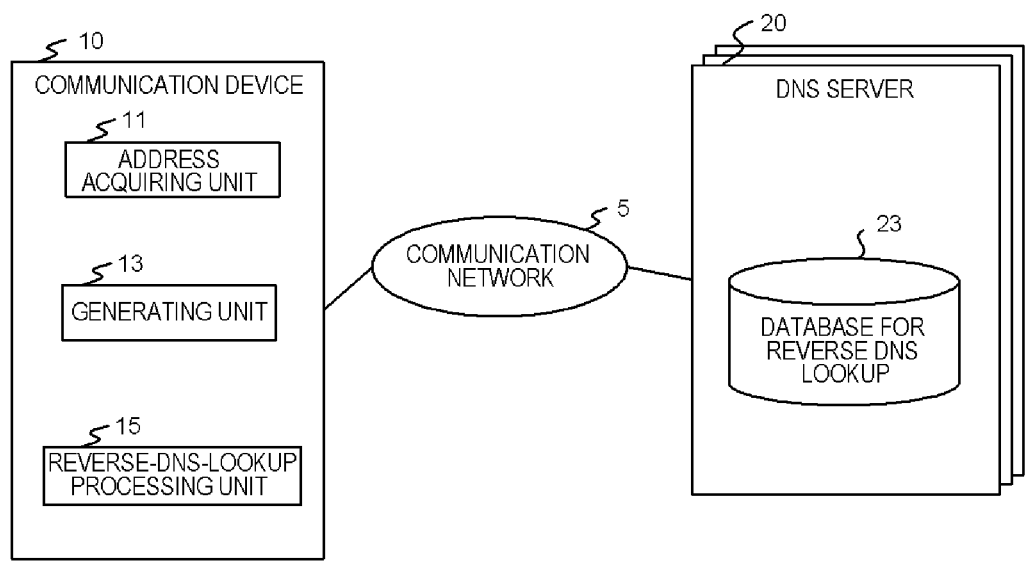
FIG. 1 is a schematic view illustrating an example of a process configuration of a communication device according to the first exemplary embodiment.

Hereinafter, an exemplary embodiment of the present invention will be described. Note that the exemplary embodiment described below is merely an example, and the present invention is not limited to the configurations of the exemplary embodiment below.

A communication device according to this exemplary embodiment includes: an address acquiring unit that acquires an IP address; a generating unit that generates, on the basis of the IP address acquired by the address acquiring unit, a special reverse lookup domain name which is different from a standard reverse lookup domain name serving as a key for obtaining a domain name corresponding to the IP address through a reverse DNS lookup; and a reverse-DNS-lookup processing unit that performs the reverse DNS lookup using, as a key, the special reverse lookup domain name generated by the generating unit, and acquires node descriptor data, which is different from the domain name and is associated with a communication device corresponding to the IP address acquired by the address acquiring unit.

Here, the reverse lookup domain name is information that is used as a key in a reverse DNS lookup, and information that is set in a DNS query packet as a query name to identify a certain PTR record in a database of a reverse DNS lookup. The reverse lookup domain name is also called, for example, a reverse lookup name, or a reverse lookup zone name. The node descriptor data is a character string that describes a communication device, or information of a link to explanation data that describes a communication device, and is data that does not have a name resolving function. The data that does not have the name resolving function means that no IP address corresponding to this data can be acquired on the basis of this data.

In this exemplary embodiment, a reverse DNS lookup using, as a key, a special reverse lookup domain name different from a standard reverse lookup domain name that is generated through an ordinary manner is performed, and node descriptor data different from the domain name obtained through the reverse DNS lookup using, as a key, this standard reverse lookup domain name is acquired. Thus, according to this exemplary embodiment, it is possible to acquire, through the reverse DNS lookup, more detailed information than the information obtained on the basis of the domain name.

In the case where the exemplary embodiment as described above is, for example, applied to a server device that keeps, as a log, information on clients who have accessed the server device, it is effective. In this case, the server device can keep, as the log, the node descriptor data containing more detailed information than the domain name, and further, the log can be more effectively analyzed. Note that this exemplary embodiment is effective not only for such a server device but also for all devices that perform the reverse DNS lookup.

Below, the above-described exemplary embodiment will be described in more detail.

First Exemplary Embodiment

FIG. 1 is a schematic view illustrating an example of a process configuration of a communication device 10 according to the first exemplary embodiment. As illustrated in FIG. 1, the communication device 10 includes, for example, an address acquiring unit 11, a generating unit 13, and a reverse-DNS-lookup processing unit 15. In the communication device 10, each of these units is realized, for example, with a hardware circuit such as an IC chip. The communication device 10 includes, for example, a central processing unit (CPU), a memory, and an input-output interface. It may be possible to realize each of the processing units described above, for example, with the CPU running a program stored in the memory. This exemplary embodiment does not limit the hardware configuration of the communication device 10.

The communication device 10 performs the reverse DNS lookup by executing the processes with the processing units described above. At this time, the communication device 10 transmits a DNS query packet containing a reverse lookup domain name as a query name through a communication network 5 to a DNS server device 20, and acquires a domain name corresponding to the reverse lookup domain name from the DNS server device 20. Note that this exemplary embodiment does not limit the mode of the communication network 5. Details of each of the processing units in the communication device 10 will be described later.

The DNS server device 20 is any one of a group of general DNS servers constituting DNS. The group of DNS servers constitute a database (DB) for reverse DNS lookup in which a reverse lookup zone (hereinafter, referred to as a public zone) having a PTR record including a domain name and a reverse lookup zone (hereinafter, referred to as private zone) having a PTR record including node descriptor data are defined. Such a DB for reverse DNS lookup may be set in a single DNS server device 20, or may be set in plural DNS server devices 20 in a distributed manner. Hereinafter, the DB for reverse DNS lookup set in a given DNS server device 20 is referred to as a DB 23 for reverse DNS lookup or DB 23.

In the DB 23 of the DNS server device 20, only the private zone may be defined, or both the public zone and the private zone may be defined. In this exemplary embodiment, it is only necessary that the private zone is defined in the DB 23, and the hardware configuration and the functional configuration of the DNS server device 20 are not limited.

[Processing Units in Communication Device 10]

The address acquiring unit 11 acquires an IP address. The IP address acquired by the address acquiring unit 11 is the argument information serving as the basis for the reverse DNS lookup processing. The address acquiring unit 11 may acquire the IP address, for example, from a file in its own device, or may acquire the IP address from other communication devices through a predetermined communication.

The generating unit 13 generates, on the basis of the IP address acquired by the address acquiring unit 11, a special reverse lookup domain name which is different from a standard reverse lookup domain name serving as a key for obtaining, through a reverse DNS lookup, a domain name corresponding to the IP address.

Here, the standard reverse lookup domain name is a reverse lookup domain name generated through a known method, and is information with which the PTR record in the public zone can be identified. For example, in the case where the IP address acquired is "133.207.36.10", the standard reverse lookup domain name is "10.36.207.133.in-addr.arpa." Similarly, in the case where the IP address acquired is in accordance with IPv6, the standard reverse lookup domain name is generated using an "ip6.arpa" zone character string.

The generating unit 13 converts the IP address acquired by the address acquiring unit 11 into a different IP address, and generates the special reverse lookup domain name on the basis of this different IP address. For the method of converting the IP address, any method may be employed, provided that the PTR record in the public zone is not identified with the finally generated special reverse lookup domain name. For example, the generating unit 13 acquires the different IP address by replacing the network prefix of the acquired IP address with another value. It is only necessary to determine this replaced value in a manner that the PTR record in the public zone is not identified with the finally generated special reverse lookup domain name.

The generating unit 13 generates, on the basis of the converted IP address, the special reverse lookup domain name by using a known method of generating the standard reverse lookup domain name.

The reverse-DNS-lookup processing unit 15 performs the reverse DNS lookup using, as the key, the special reverse lookup domain name generated by the generating unit 13, and acquires node descriptor data different from the domain name in association with a communication device corresponding to the IP address acquired by the address acquiring unit 11. More specifically, the reverse-DNS-lookup processing unit 15 generates a DNS query packet containing this special reverse lookup domain name as a query name, transmits the DNS query packet to the DNS server device 20, and receives a response packet corresponding to this DNS query packet from the DNS server device 20. The node descriptor data is set to the resource data of this response packet.

[Example of Operation]

Figure 2:
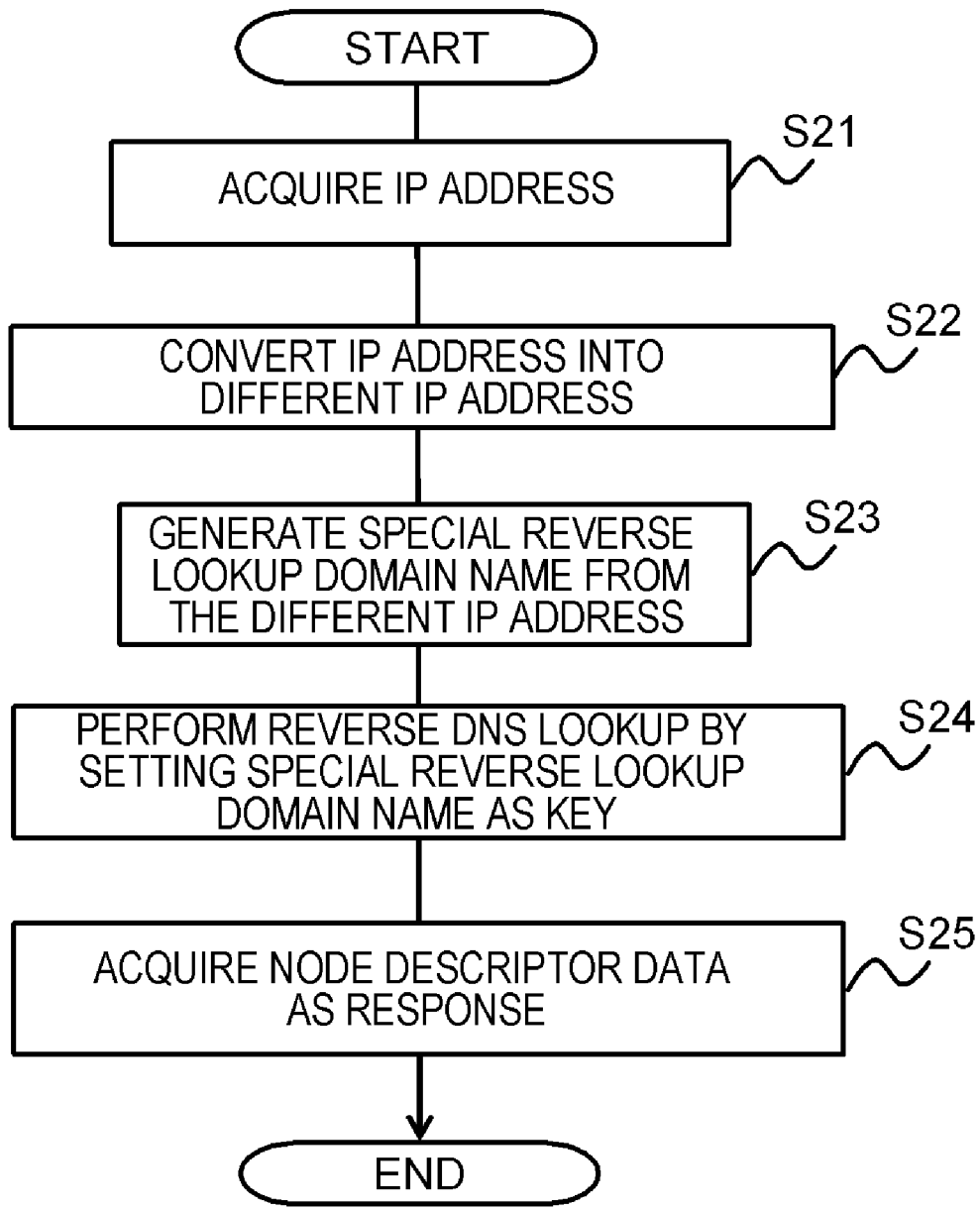
FIG. 2 is a flowchart showing an example of operations performed by the communication device according to the first exemplary embodiment.

FIG. 2 is a flowchart showing an example of operations performed by the communication device 10 according to the first exemplary embodiment.

The address acquiring unit 11 acquires the IP address (S21). Here, it is assumed that the acquired IP address is "133.207.36.10."

Then, the generating unit 13 converts the IP address acquired by the address acquiring unit 11 into a different IP address (S22). Here, it is assumed that the generating unit 13 acquires the different IP address by replacing the network prefix of the acquired IP address with another value. In the example described above, the generating unit 13 replaces the three bytes from the head of "133.207.36.10," thereby converting this IP address into "192.168.1.10."

Next, the generating unit 13 generates, on the basis of the converted different IP address, the special reverse lookup domain name using a known method of generating the standard reverse lookup domain name (S23). In the example described above, the generating unit 13 generates the special reverse lookup domain name "10.1.168.192.in-addr.arpa." on the basis of the IP address "192.168.1.10."

It should be noted that, for the purpose of explanation, FIG. 2 illustrates that the generating unit 13 performs process S22 and process S23 separately. However, these processes may be performed as one process. It is only necessary that, after process S23 is completed, the special reverse lookup domain name is generated on the basis of the different IP address converted from the original IP address.

The reverse-DNS-lookup processing unit 15 performs the reverse DNS lookup using this special reverse lookup domain name as a key (S24). In the example described above, the reverse-DNS-lookup processing unit 15 transmits, to the DNS server device 20, the DNS query packet containing the special reverse lookup domain name "10.1.168.192.in-addr.arpa." as a query name.

At this time, in the DB 23 of the DNS server device 20, the PTR record in the private zone identified on the basis of the special reverse lookup domain name generated by the generating unit 13 of the communication device 10 has already been set. Thus, upon receiving this DNS query packet, the DNS server device 20 extracts the node descriptor data from this PTR record in the private zone identified on the basis of the special reverse lookup domain name, and returns, to the communication device 10, the response packet containing this extracted node descriptor data as the resource data.

Once the response packet is received in the communication device 10, the reverse-DNS-lookup processing unit 15 acquires the node descriptor data from this response packet (S25).

[Operation and Effect of First Exemplary Embodiment]

As described above, in the first exemplary embodiment, the acquired IP address is converted into a different IP address, and the special reverse lookup domain name is generated on the basis of this converted IP address by using a known method of generating the standard reverse lookup domain name. As a result, the reverse DNS lookup using the special reverse lookup domain name as a key is performed, and the node descriptor data set in the private zone in the DNS is acquired.

Thus, according to the first exemplary embodiment, the communication device 10 can obtain more detailed information than the domain name obtained from the public zone, while leaving the information existing in the DNS (information in the public zone) unaffected.

Further, in the first exemplary embodiment, the special reverse lookup domain name serving as the key in the reverse DNS lookup contains the data which indicates not the IP address serving as the argument information which is the basis for the reverse DNS lookup, but the different IP address that has been converted. Thus, according to the first exemplary embodiment, even if communications between the communication device 10 and the DNS server device 20 are intercepted, it is possible to prevent the leakage of combinations of the original IP address and the domain name from the DNS query packet and the response packet.

Second Exemplary Embodiment

The second exemplary embodiment gives an example different from the first exemplary embodiment that relates to a method of generating a special reverse lookup domain name. The communication device 10 according to the second exemplary embodiment has a configuration similar to that of the first exemplary embodiment, and part of the processes is different from that in the first exemplary embodiment. Below, the communication device 10 according to the second exemplary embodiment will be described with focus being placed on things different from those in the first exemplary embodiment.

In the second exemplary embodiment, the generating unit 13 first generates the standard reverse lookup domain name on the basis of the IP address acquired by the address acquiring unit 11, and generates the special reverse lookup domain name by converting the generated standard reverse lookup domain name. Here, it may be possible to employ any manner to covert the standard reverse lookup domain name into the special reverse lookup domain name, provided that the PTR record in the public zone is not identified with the finally generated special reverse lookup domain name.

For example, the generating unit 13 converts the standard reverse lookup domain name into the special reverse lookup domain name by adding data indicating a new reverse lookup zone to the standard reverse lookup domain name. The new reverse lookup zone may be added to the lowest level in a DNS tree indicated by the standard reverse lookup domain name, or to a portion immediately below an "in-addr.arpa" zone or "ip6.arpa" zone in the DNS tree. For example, the generating unit 13 converts a standard reverse lookup domain name "28.36.207.133.in-addr.arpa." into a "28.36.207.133.xxx.in-addr.arpa." ("xxx" represents given data) or "yyy.28.36.207.133.in-addr.arpa." ("yyy" represents given data).

As described above, by employing the method of adding data indicating a new reverse lookup zone to the standard reverse lookup domain name in the method of converting the standard reverse lookup domain name into the special reverse lookup domain name, the PTR record in the public zone cannot be identified with the finally generated special reverse lookup domain name. Thus, in this case, it is possible to eliminate the limitation of rule for conversion performed by the generating unit 13, whereby it is possible to freely determine the rule for conversion.

[Example of Operation]

Figure 3:
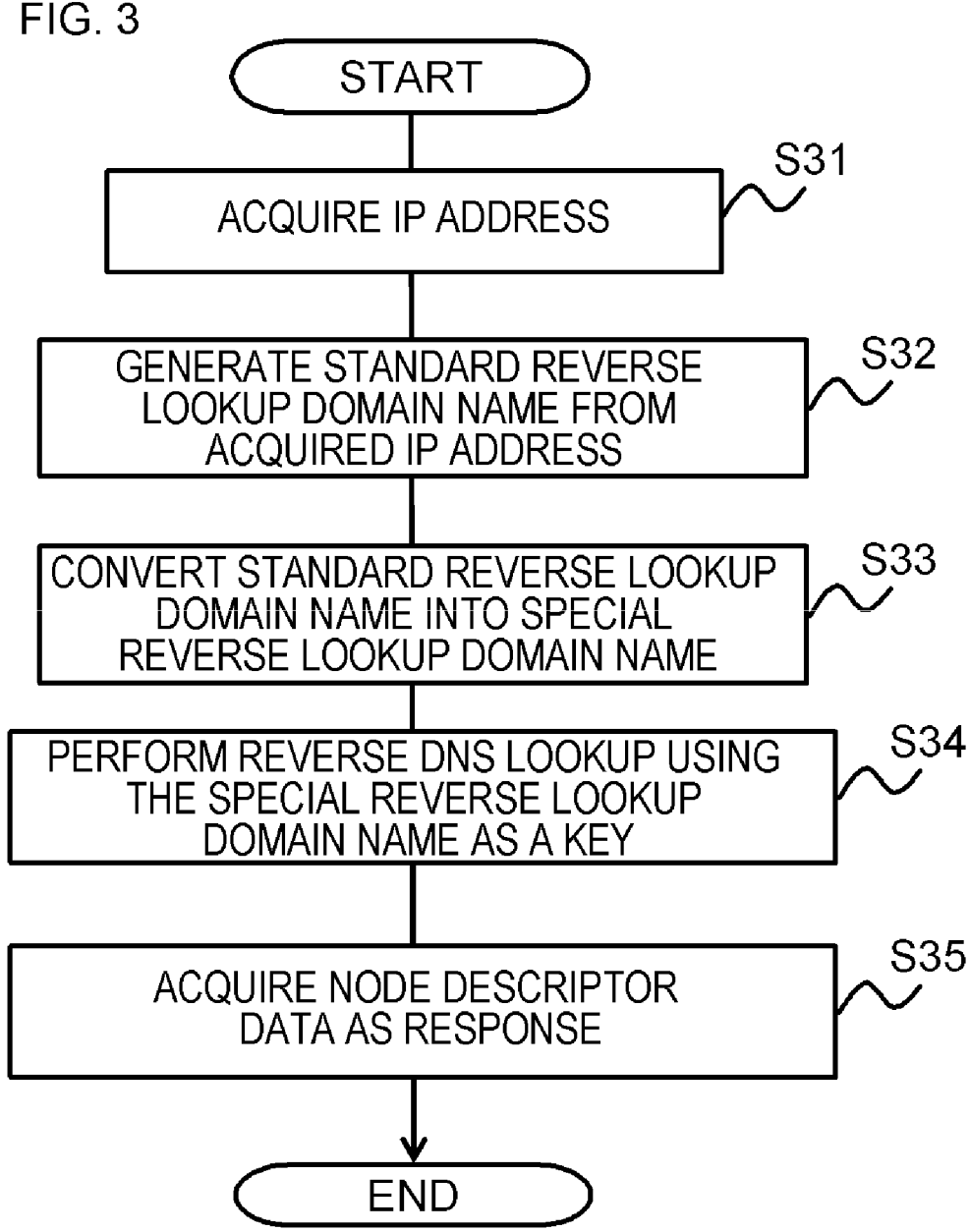
FIG. 3 is a flowchart showing an example of operations performed by a communication device according to the second exemplary embodiment.

FIG. 3 is a flowchart showing an example of operations performed by the communication device 10 according to the second exemplary embodiment.

The address acquiring unit 11 acquires an IP address (S31). Here, it is assumed that the IP address acquired is "133.207.36.28."

Then, the generating unit 13 generates the standard reverse lookup domain name on the basis of the IP address acquired by the address acquiring unit 11 by using a known method of generating the standard reverse lookup domain name (S32). In the example described above, the generating unit 13 generates the standard reverse lookup domain name "28.36.207.133.in-addr.arpa." on the basis of the IP address "133.207.36.28."

The generating unit 13 converts the generated standard reverse lookup domain name into a special reverse lookup domain name through a predetermined editing process (S33). The predetermined editing process represents, for example, adding data indicating a new reverse lookup zone as described above. In the example described above, the generating unit 13 converts the standard reverse lookup domain name "28.36.207.133.in-addr.arpa." into the special reverse lookup domain name "28.36.207.133.xxx.in-addr.arpa." Note that the generating unit 13 may use other conversion methods.

It should be noted that, for the purpose of explanation, FIG. 3 illustrates that the generating unit 13 performs process S32 and process S33 separately. However, these processes may be performed as one process. It is only necessary that, after process S33 is completed, the special reverse lookup domain name, which has been subjected to the predetermined editing process, is generated on the basis of the standard reverse lookup domain name generated on the basis of the original IP address.

The reverse-DNS-lookup processing unit 15 performs the reverse DNS lookup using this special reverse lookup domain name as a key (S34). In the example described above, the reverse-DNS-lookup processing unit 15 transmits, to the DNS server device 20, a DNS query packet containing the special reverse lookup domain name "28.36.207.133.xxx.in-addr.arpa." as a query name.

At this time, in the DB 23 of the DNS server device 20, the PTR record in the private zone identified on the basis of the special reverse lookup domain name generated by the generating unit 13 of the communication device 10 has already been set. Upon receiving this DNS query packet, the DNS server device 20 extracts the node descriptor data from the PTR record in the private zone identified on the basis of the special reverse lookup domain name, and returns, to the communication device 10, the response packet containing the extracted node descriptor data as the resource data.

Once the communication device 10 receives this response packet, the reverse-DNS-lookup processing unit 15 acquires the node descriptor data from the response packet (S35).

[Operation and Effect of Second Exemplary Embodiment]

As described above, in the second exemplary embodiment, the standard reverse lookup domain name is generated through a known method on the basis of the acquired IP address, and is subjected to a predetermined editing process, whereby the special reverse lookup domain name is finally generated. Thus, according to the second exemplary embodiment, the flexibility in generating the special reverse lookup domain name in a manner that the PTR record in the public zone is not identified can be further improved than the first exemplary embodiment.

Further, the reverse DNS lookup using the special reverse lookup domain name as the key is performed, and the node descriptor data to be set in the private zone of DNS can be acquired. In other words, with the second exemplary embodiment, an effect similar to that obtained with the first exemplary embodiment can be obtained.

Third Exemplary Embodiment

In third exemplary embodiment, the special reverse lookup domain name is generated with a mode in which the first exemplary embodiment and the second exemplary embodiment are combined. The communication device 10 according to the third exemplary embodiment has a configuration similar to those of the first exemplary embodiment and the second exemplary embodiment, and part of the processes is different from those of the first exemplary embodiment and the second exemplary embodiment. Below, the communication device 10 according to the third exemplary embodiment will be described with focus being placed on things different from those in the first exemplary embodiment and the second exemplary embodiment.

The generating unit 13 converts the IP address acquired by the address acquiring unit 11 into a different IP address, generates the reverse lookup domain name on the basis of this converted IP address by using the method same as that of generating the standard reverse lookup domain name, and converts the generated reverse lookup domain name into the special reverse lookup domain name through a similar manner to that in the second exemplary embodiment. As described above, in the third exemplary embodiment, the special reverse lookup domain name is generated through a method obtained by combining the first exemplary embodiment and the second exemplary embodiment.

[Example of Operation]

Figure 4:
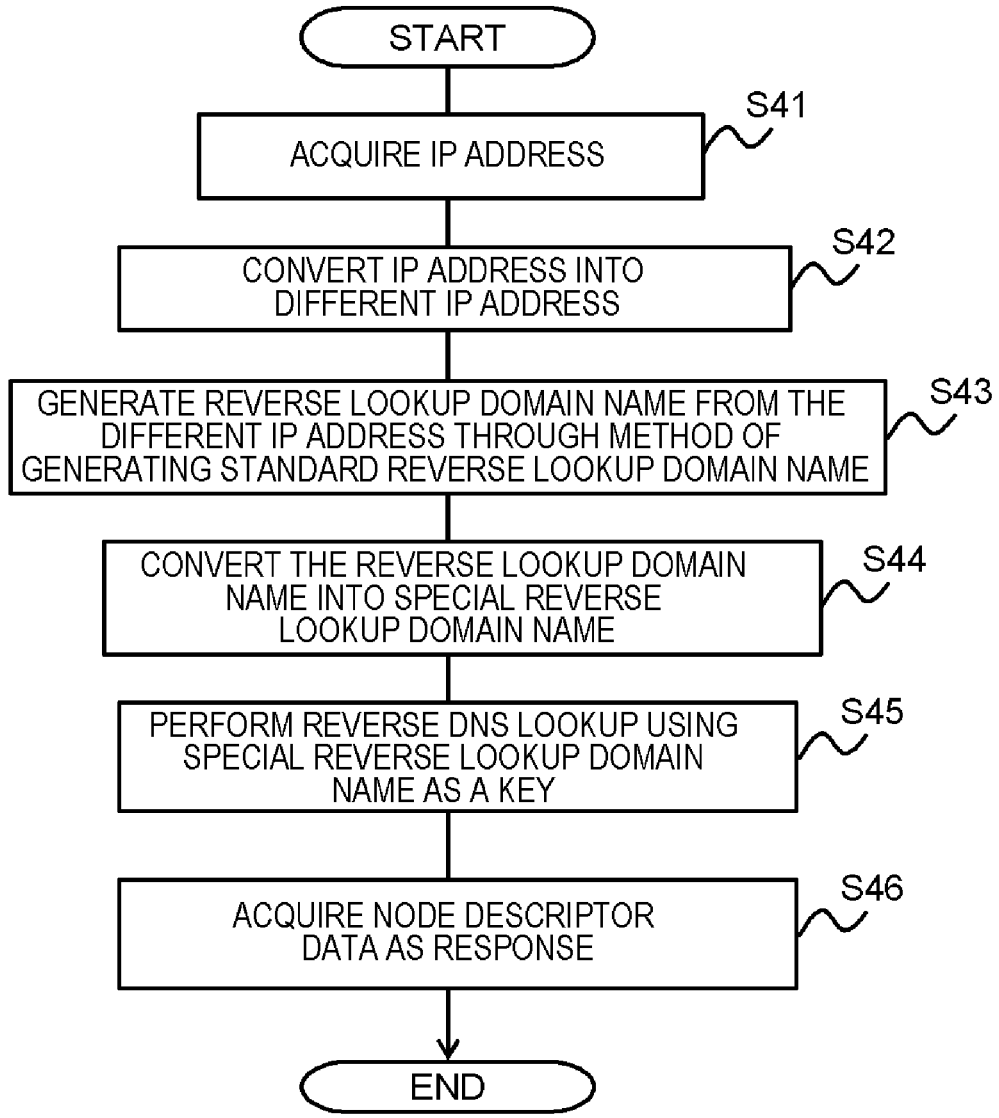
FIG. 4 is a flowchart showing an example of operations performed by a communication device according to the third exemplary embodiment.

FIG. 4 is a flowchart showing an example of operations performed by the communication device 10 according to the third exemplary embodiment.

The address acquiring unit 11 acquires the IP address (S41). Here, it is assumed that the acquired IP address is "133.207.36.28."

The generating unit 13 converts the IP address acquired by the address acquiring unit 11 into a different IP address through a method similar to that of the first exemplary embodiment (S42). In the example described above, the generating unit 13 replaces the three bytes from the head of "133.207.36.28," thereby converting the IP address into "192.168.1.28."

Then, the generating unit 13 generates the reverse lookup domain name on the basis of the converted IP address by using a known method of generating the standard reverse lookup domain name (S43). In the example described above, the generating unit 13 generates the reverse lookup domain name "28.1.168.192.in-addr.arpa." from the IP address "192.168.1.28."

The generating unit 13 adds data indicating a new reverse lookup zone to the generated reverse lookup domain name, thereby converting the reverse lookup domain name into the special reverse lookup domain name (S44). In the example described above, the generating unit 13 converts the reverse lookup domain name "28.1.168.192.in-addr.arpa." into the special reverse lookup domain name "28.1.168.192.xxx.in-addr.arpa." Note that the generating unit 13 may use other converting methods.

It should be noted that, for the purpose of explanation, FIG. 4 illustrates that the generating unit 13 performs processes S42 to process S44 separately. However, these processes may be performed as one process. It is only necessary that, after process S44 is completed, the special reverse lookup domain name is generated on the basis of the different IP address converted from the original IP address, and the reverse lookup domain name generated on the basis of the different IP address.

The reverse-DNS-lookup processing unit 15 performs the reverse DNS lookup using this special reverse lookup domain name as a key (S45). In the example described above, the reverse-DNS-lookup processing unit 15 transmits, to the DNS server device 20, the DNS query packet containing the special reverse lookup domain name "28.1.168.192.xxx.in-addr.arpa." as a query name.

As a result, the communication device 10 receives the response packet from the DNS server device 20, and the reverse-DNS-lookup processing unit 15 acquires the node descriptor data from this response packet (S46).

[Operation and Effect of Third Exemplary Embodiment]

As described above, in the third exemplary embodiment, the acquired IP address is converted into the different IP address, the reverse lookup domain name is generated on the basis of this converted IP address through a known method, and the reverse lookup domain name is subjected to a predetermined editing process, whereby the special lookup domain name is finally generated. Thus, according to the third exemplary embodiment, it is possible to obtain an effect similar to that obtained from the first exemplary embodiment and the second exemplary embodiment.

Fourth Exemplary Embodiment

In the fourth exemplary embodiment, at least one DNS server device 20 having the DB 23 for reverse DNS lookup in which only the private zone is defined is provided. In other words, the fourth exemplary embodiment gives an example in which a group of DNS servers having the DB for reverse DNS lookup with only the private zone being defined, and a group of DNS servers having the DB for reverse DNS lookup with only the public zone being defined are separately provided. Below, the communication device 10 according to the fourth exemplary embodiment will be described with focus being placed on things different from those of the first exemplary embodiment to third exemplary embodiment.

Figure 5:
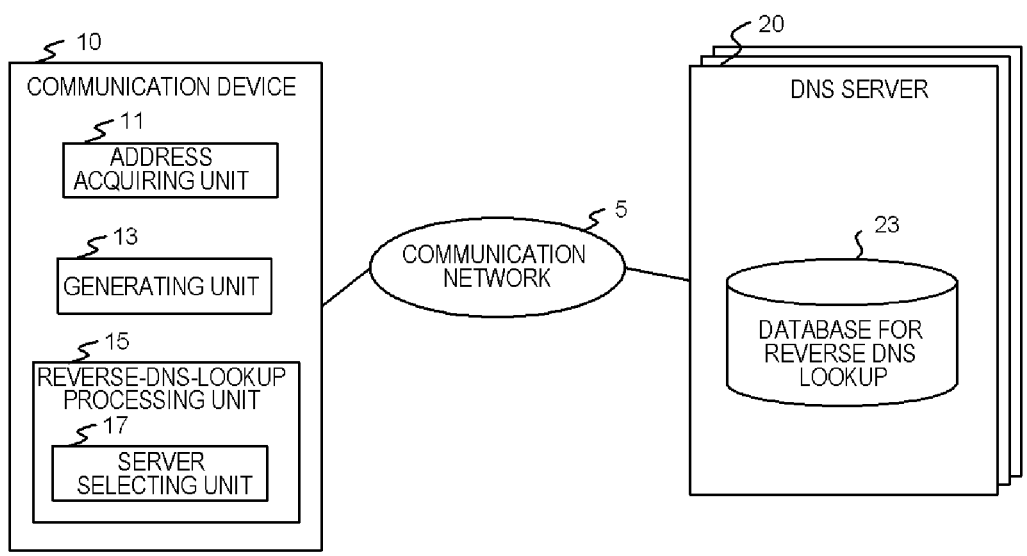
FIG. 5 is a schematic view illustrating an example of a configuration of a communication device according to the fourth exemplary embodiment.

FIG. 5 is a schematic view illustrating an example of a configuration of the communication device 10 according to the fourth exemplary embodiment. The communication device 10 according to the fourth exemplary embodiment further includes a server selecting unit 17 in addition to the configurations of each of the exemplary embodiments described above. Similarly, the server selecting unit 17 is realized with a software configuration element, a hardware configuration element, or a combination thereof. Note that, in FIG. 5, the server selecting unit 17 is realized as the internal process of the reverse-DNS-lookup processing unit 15. However, the reverse-DNS-lookup processing unit 15 and the server selecting unit 17 may be realized as separate elements.

In the fourth exemplary embodiment, in response to an instruction from other processing units (not illustrated), the generating unit 13 switches the reverse lookup domain name generated as a key for the reverse DNS lookup between the standard reverse lookup domain name and the special reverse lookup domain name, by using the IP address acquired by the address acquiring unit 11 as the original argument information. In the case where the special reverse lookup domain name is generated, any one of the methods described in the exemplary embodiments described above is used. Note that, in the fourth exemplary embodiment, the DNS server device 20 with the private zone and the DNS server device 20 with the public zone are separately provided. Thus, there is no restriction to the method of generating the special reverse lookup domain name performed by the generating unit 13 (conversion method).

Depending on the type of the reverse lookup domain name generated by the generating unit 13, the server selecting unit 17 selects any one of the DNS server device 20 with the private zone and the DNS server device 20 with the public zone as the destination of the DNS query packet. The server selecting unit 17 maintains in advance the IP address of the DNS server device 20 with the private zone and the IP address of the DNS server device 20 with the public zone.

The reverse-DNS-lookup processing unit 15 transmits, to the IP address of the DNS server device 20 selected by the server selecting unit 17 as the destination, the DNS query packet containing the standard reverse lookup domain name or the special reverse lookup domain name generated by the generating unit 13.

As a result, the DNS sever device 20 with the public zone that receives the DNS query packet containing the standard reverse lookup domain name extracts the domain name from the PTR record identified on the basis of the standard reverse lookup domain name, and returns the response packet containing this domain name to the communication device 10. On the other hand, the DNS server device 20 with the private zone that receives the DNS query packet containing the special reverse lookup domain name extracts the node descriptor data from the PTR record identified on the basis of this special reverse lookup domain name, and returns the response packet containing this node descriptor data to the communication device 10.

In the case where the DNS query packet containing the standard reverse lookup domain name is transmitted, the reverse-DNS-lookup processing unit 15 acquires the domain name from the response packet. On the other hand, in the case where the DNS query packet containing the special reverse lookup domain name is transmitted, the reverse-DNS-lookup processing unit 15 acquires the node descriptor data from the response packet.

[Operation and Effect of Fourth Exemplary Embodiment]

As described above, in the fourth exemplary embodiment, the reverse lookup domain name serving as the key for the reverse DNS lookup is switched between the standard reverse lookup domain name and the special reverse lookup domain name. Then, according to the type of the generated reverse lookup domain name, the DNS server device 20 serving as the first transmission destination of the DNS query packet transmitted for the purpose of the reverse DNS lookup is switched between the DNS server device 20 with the private zone and the DNS server device 20 with the public zone.

Thus, according to the fourth exemplary embodiment, it is possible to increase the degree of freedom in determining the rule of generating the special reverse lookup domain name on the basis of the IP address serving as the original argument information. Further, depending on applications, it is possible to switch the data acquired through the reverse DNS lookup between the general domain name and the node descriptor data including more detailed information than the domain name.

The present application claims priority based on Japanese Patent Application No. 2011-193516 filed in Japan on Sep. 6, 2011, the disclosures of which are incorporated herein by reference in their entirety.

The invention claimed is:

1. A communication device, comprising:
   an address acquiring unit that acquires an IP (Internet Protocol) address;
   a generating unit that generates, on the basis of the IP address acquired by the address acquiring unit, a special reverse lookup domain name which is different from a standard reverse lookup domain name serving as a key for obtaining a domain name corresponding to the IP address through a reverse DNS (Domain Name System) lookup; and
   a reverse-DNS-lookup processing unit that performs the reverse DNS lookup using, as a key, the special reverse lookup domain name generated by the generating unit, and acquires node descriptor data, which is different from the domain name and is associated with a communication device corresponding to the IP address acquired by the address acquiring unit.

2. The communication device according to claim 1, wherein
the generating unit converts the IP address acquired by the address acquiring unit into a different IP address, and generates the special reverse lookup domain name on the basis of this different IP address.

3. The communication device according to claim 2, wherein
the generating unit generates a reverse lookup domain name on the basis of the different IP address using the method same as that for generating the standard reverse lookup domain name on the basis of the IP address, and converts the generated reverse lookup domain name to generate the special reverse lookup domain name.

4. The communication device according to claim 1, wherein
the generating unit generates the standard reverse lookup domain name on the basis of the IP address acquired by the address acquiring unit, and converts the generated standard reverse lookup domain name to generate the special reverse lookup domain name.

5. The communication device according to claim 1, wherein
the generating unit generates any one of the standard reverse lookup domain name and the special reverse lookup domain name as a reverse lookup domain name used as a key for the reverse DNS lookup performed by the reverse-DNS-lookup processing unit, and
the reverse-DNS-lookup processing unit:
includes a server selecting unit that changes a DNS server serving as a transmission destination of a DNS query packet for the reverse DNS lookup depending on whether the reverse lookup domain name serving as the key for the reverse DNS lookup and generated by the generating unit is the standard reverse lookup domain name or the special reverse lookup domain name, and acquires an IP address of the changed DNS server; and
transmits the DNS query packet that includes the reverse lookup domain name serving as the key for the reverse DNS lookup and generated by the generating unit and that serves the IP address of the DNS server acquired by the server selecting unit as a destination.

6. A communication method, including:
acquiring an IP (Internet Protocol) address;
generating, on the basis of the acquired IP address, a special reverse lookup domain name which is different from a standard reverse lookup domain name serving as a key for obtaining a domain name corresponding to the acquired IP address through a reverse DNS (Domain Name System) lookup;
performing the reverse DNS lookup using the generated special reverse lookup domain name as a key; and
acquiring node descriptor data, which is different from the domain name and is associated with a communication device corresponding to the acquired IP address.

7. The communication method according to claim 6, wherein
said generating the special reverse lookup domain name includes:
converting the acquired IP address into a different IP address; and
generating the special reverse lookup domain name on the basis of the converted different IP address.

8. The communication method according to claim 7, wherein
said generating the special reverse lookup domain name includes:
generating a reverse lookup domain name on the basis of the different IP address using the method same as that for generating the standard reverse lookup domain name on the basis of the IP address; and
converting the generated reverse lookup domain name to generate the special reverse lookup domain name.

9. The communication method according to claim 6, wherein
said generating the special reverse lookup domain name includes:
generating the standard reverse lookup domain name on the basis of the acquired IP address; and
converting the generated standard reverse lookup domain name to generate the special reverse lookup domain name.

10. The communication method according to claim 6, wherein
said generating the special reverse lookup domain name includes generating any one of the standard reverse lookup domain name and the special reverse lookup domain name as a reverse lookup domain name used as a key for the reverse DNS lookup, and
said performing the reverse DNS lookup includes:
changing a DNS server serving as a transmission destination of a DNS query packet for the reverse DNS lookup depending on whether the generated reverse lookup domain name serving as the key for the reverse DNS lookup is the standard reverse lookup domain name or the special reverse lookup domain name;
acquiring an IP address of the changed DNS server; and
transmitting the DNS query packet that includes the generated reverse lookup domain name serving as the key for the reverse DNS lookup and that serves the acquired IP address of the DNS server as a destination.

11. A non-transitory computer-readable storage medium storing a program for causing a computer to realize:
an address acquiring unit that acquires an IP (Internet Protocol) address;
a generating unit that generates, on the basis of the IP address acquired by the address acquiring unit, a special reverse lookup domain name which is different from a standard reverse lookup domain name serving as a key for obtaining a domain name corresponding to the IP address through a reverse DNS (Domain Name System) lookup; and
a reverse-DNS-lookup processing unit that performs the reverse DNS lookup using, as a key, the special reverse lookup domain name generated by the generating unit, and acquires node descriptor data, which is different from the domain name and is associated with a communication device corresponding to the IP address acquired by the address acquiring unit.

* * * * *